(12) United States Patent
Paul

(10) Patent No.: US 6,367,268 B1
(45) Date of Patent: Apr. 9, 2002

(54) COLD TRANSPORTATION METHOD

(75) Inventor: Joachim Paul, Flensburg (DE)

(73) Assignee: Integral Energietechnik GmbH, Flensburg (DE)

( * ) Notice: Subject to any disclaimer, the term of this patent is extended or adjusted under 35 U.S.C. 154(b) by 0 days.

(21) Appl. No.: 09/787,001

(22) PCT Filed: Sep. 14, 1998

(86) PCT No.: PCT/DE98/02724

§ 371 Date: Mar. 12, 2001

§ 102(e) Date: Mar. 12, 2001

(87) PCT Pub. No.: WO00/16027

PCT Pub. Date: Mar. 23, 2000

(51) Int. Cl.⁷ ............................................... F25D 3/02
(52) U.S. Cl. ............................................. 62/59; 62/330
(58) Field of Search ........................... 62/59, 66, 330

(56) References Cited

U.S. PATENT DOCUMENTS

| | | | |
|---|---|---|---|
| 5,005,364 A | * 4/1991 | Nelson | 62/330 |
| 5,056,320 A | * 10/1991 | Winkler | 62/59 |
| 5,065,598 A | * 11/1991 | Kurisa et al. | 62/59 |
| 5,381,670 A | * 1/1995 | Tippmann et al. | 62/330 |
| 5,481,882 A | * 1/1996 | Watanabe et al. | 62/59 |
| 6,158,499 A | * 12/2000 | Rhodes et al. | 62/59 |
| 6,244,052 B1 | * 6/2001 | Kasza | 62/330 |

* cited by examiner

Primary Examiner—William E. Tapolcai
(74) Attorney, Agent, or Firm—Larson & Larson, P.A.; James E. Larson

(57) ABSTRACT

A method for the refrigerated transportation of a product introduced into a hollow-walled refrigerated container. The steps of the method include:

a) keeping a pumpable suspension of minute ice crystals (binary-ice), having a predetermined composition and temperature in a reservoir;

b) emptying an optionally filled wall of a refrigerated container through an outlet valve, thereby filling the emptied wall of the refrigerated container with binary-ice;

c) allowing the binary ice to circulate in the refrigerated container by means of filling valves, which are supplied by the binary ice reservoir until the wall temperature has dropped to a predetermined level and heated fluid passing out of the outlet valve is supplied to the reservoir;

d) filling the wall of the refrigerated container with binary ice up to a predetermined level and decoupling the refrigerated container from the filling valves; and e) returning the binary ice fluid into a corresponding binary ice liquid reservoir for further production of binary ice from the binary ice fluid.

11 Claims, 13 Drawing Sheets

COLD TRANSPORTATION METHOD

PRIOR APPLICATIONS

This application is a §371 U.S. National Phase application which bases priority on International Application No. PCT/DE98/02724, filed Sep. 14, 1998 (09.14.98).

BACKGROUND OF THE INVENTION

1. Field of the Invention

This invention relates to a method for the refrigerated transportation of a product in a hollow-walled container.

2. Description of the Prior Art

Refrigerated transport, also referred to hereinafter by its abbreviation RT, must be available more particularly for maintaining a so-called refrigeration chain for fresh products such as vegetables, fruit, meat or other foods. Sensitive products such as chemicals, biological products and explosives must also be transported in partly refrigerated form. Refrigerated transport (RT) includes refrigeration for trucks, small transporters, railway trucks, containers, ships, and boats, to name just a few.

Known refrigerated transportation essentially uses compressor cooling or refrigeration, a refrigerant being evaporated in the pipes of a refrigerator and cools or refrigerates air or gas (controlled atmosphere).

Heat is removed by producing a cold surface and circulating air or gas being made colder and, once the dew point temperature is reached, is also humidified.

As a function of the heat load, the refrigerator switches on or off or runs in a power-controlled manner. Such mechanical refrigeration systems are expensive and require maintenance, spares, trained mechanics and a complicated and costly power supply in the form of electric, diesel electric or diesel drives, in order to maintain refrigeration in all circumstances.

In certain applications, use is made of indirect cooling or refrigeration for cooling or refrigerating air or gas through the circulation of a refrigerant, e.g. a saline solution through a refrigerator in place of direct evaporation of the refrigerant.

The products are stored in a refrigerated chamber, which is either part of the structure of a motor vehicle or a type of container (hereinafter "RC"), which can be loaded and unloaded. Such containers are normally externally insulated to keep heat penetration as low as possible. Containers contain air coolers and devices for circulating air, e.g. fans.

In certain applications, such as e.g. distribution vehicles, the temperature of a container is maintained or changed through the use of so-called eutectic plates, which are conventionally pre-cooled by means of a refrigerator or by placing in a cold storage room. It is also possible to pass air through an ice bed. For special transportation tasks such as e.g. air freight, use is made of $CO_2$. Another practicable way of maintaining or influencing the temperature of containers is to spray $N_2$ into the containers.

Numerous different ways have already been proposed in order to obtain refrigeration for refrigerated transportation and refrigerated containers. Thus, e.g. DE-OS 1 551 365 and EP 664 426 provide for the placing of pipes in the gap between a double wall of a container, and through said gap is pumped a refrigerant (brine), such as e.g. saline solution, which cools a fluid contained in the wall gap, and finally freezes out. Freezing out serves to make available for conversion for a specific time, latent energy (stored frigorific energy), when the refrigerated container is separated from a refrigerator, e.g. during refrigerated transportation periods. The liquid which can be frozen out can be water or a brine, e.g., a saline solution/eutectic.

In practice, in this prior art method, the refrigerated container is connected to a refrigerator and refrigerant is introduced into the pipe system. The cooling process is slow, because the entire structure within the refrigerated container, together with the liquid, must first be cooled and then frozen.

DE-OS 1 751 608 describes a method in which cooling or refrigeration takes place by crushed ice in the wall gaps of a refrigerated container, in order in this way to have an energy storage means during refrigerated transport. This also includes a proposal in which a refrigerated container or the double-walled elements of such a container incorporates a eutectic fluid in a cold chamber prior to refrigerated transport. Reference is also made to DE-OS 2 251 529 which relates to a contact refrigerating or cooling device for the transportation of biological cells and organs, which is pre-cooled by a refrigerator or is cooled by the evaporation of a substance, and which is subsequently cooled with a refrigerator following a certain period of time.

Finally, European Patent Application No. 158 378 proposes a method for compensating the volume expansion of freezing and melting substances in a closed chamber, such as e.g. the refrigerated container double wall.

SUMMARY OF THE INVENTION

The problem of the present invention is to provide a system for refrigerated transport, which without great apparatus expenditure rapidly cools the refrigerated container to the temperature corresponding to the intended use, without it being necessary to provide or operate refrigeration units for cooling or during transportation.

According to the invention, this problem is solved by a method having the features of the main claim. The subclaims contain advantageous embodiments of the invention. The invention makes use of binary ice (BI), which is a suspension of minute ice crystals. Binary ice is produced from an aqueous solution or mixture in special evaporators by cooling a surface and scraping off therefrom the ice crystals produced, or by a direct contact heat exchanger in which the aqueous solution or mixture produces ice crystals in the liquid at the triple point of the liquid (e.g. water 0.1° C., 6 mb).

Binary ice is a liquid, pumpable fluid which can also be referred to as slurry ice. Due to the presence of ice crystals in the suspension, the liquid contains latent energy, which significantly increases the enthalpy of the pure liquid, and consequently makes the binary ice an excellent medium for transporting, transferring and storing frigorific energy. In the method according to the present invention, within a very short time there can be a refrigeration or cooling precisely matched to the intended use.

This invention makes use of the unique characteristics of such a binary ice for the dynamic transportation of a refrigeration system. A refrigerated container according to the invention comprises two walls, the outside of which is insulated. The gap contains no pipes and instead merely comprises structural stiffening and baffle plates for the flow and storage of binary ice. Construction is made much easier as a result of the lack of pipes.

Binary ice is made available by a binary ice filling station, which comprises a plurality of binary ice-producing machines and storage tanks for the binary ice and reservoirs for binary ice liquid. Binary ice is produced by different binary ice-producing machines at different temperatures, which are suitable for different cooling or refrigerating uses, e.g. for flowers at +6° C., for dairy products at +1° C., for fresh fish at −1° C., for frozen fish at −18° C., and for ice cream at −20 C.

BRIEF DESCRIPTION OF THE DRAWINGS

Further features and advantages of the present invention can be gathered from the following descriptions of the preferred embodiment with reference to the attached drawings, wherein.

DETAILED DESCRIPTION OF THE PREFERRED EMBODIMENT

Figure 1:
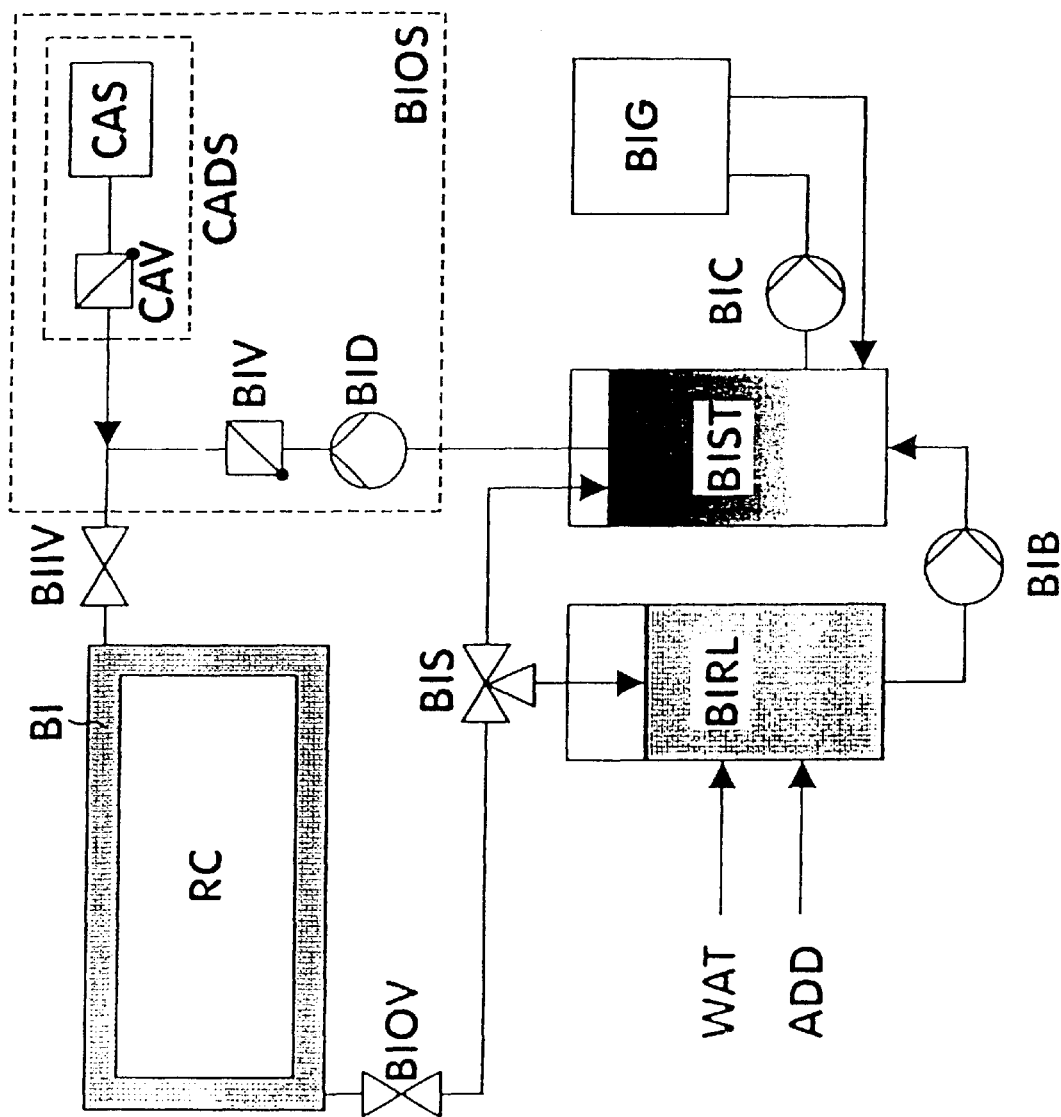
FIG. 1 shows a typical binary ice filling station for refrigerated transport.
Figure 2:
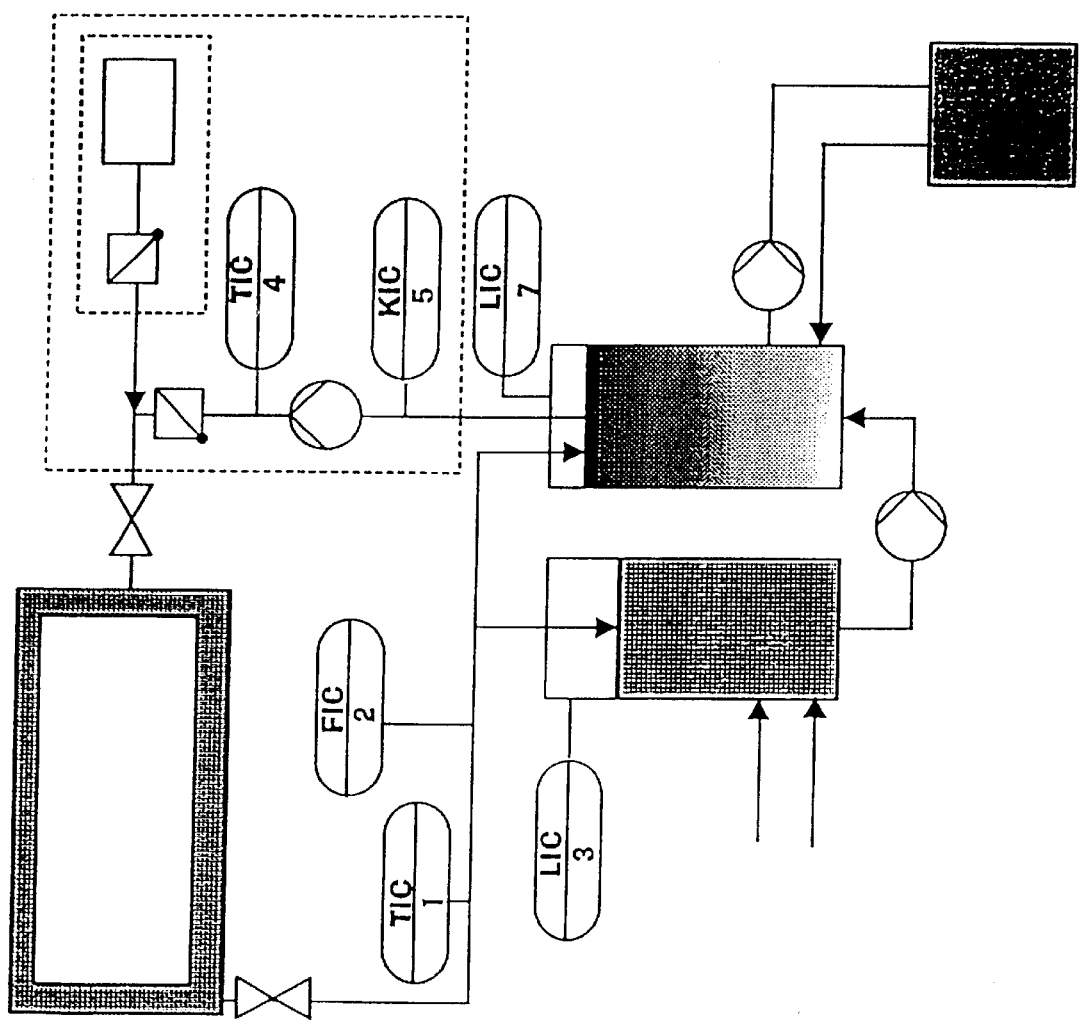
FIG. 2 shows a diagrammatic representation of the measurements and controls carried out when monitoring the filling process.

The system shown in FIG. 1 comprises a refrigerated container RC, which has a binary ice(BI)-filled wall, which is filled and emptied by means of the binary ice intake valve BIIV and the binary ice outlet valve BIOV. The reference BIS designates a binary ice valve, which returns emptied binary ice either into a binary ice liquid reservoir BIRL or a binary ice reservoir BIST. A binary ice pump BIB delivers binary ice to the binary ice reservoir BIST, so that a desired ice concentration is obtained.

The binary ice reservoir BIST is loaded or charged by means of a binary ice loading or charging pump BIC from the binary ice producer BIG. The broken border of FIG. 1 represents the components of the binary ice operating station BIOS, namely a binary ice discharge pump BID, followed by a check valve. Behind said check valve is located a compressed air feed line, which serves to introduce compressed air from the compressed air system CADS from a compressed air source CAS, via a compressed air valve CAV. The compressed air is used for the accelerated emptying of the double wall. It is also possible to use a vacuum.

In the wall of a proposed refrigerated container RC, advantageously to the inside of a stainless steel or plastic rigid wall facing the refrigerated product, would be connected a space for binary ice, and to the outside a much thicker insulating layer surrounded by e.g. two plastic walls.

As shown in FIG. 1, melted binary ice is fed out through the binary ice outlet valve BIOV, and in an another embodiment, by the application of a vacuum, e.g. a vacuum pump, from the RC wall.

The binary ice fed out through the valve BIOV can be returned directly by the valve BIS into the binary ice reservoir BIST. This is, in particular, the case if the melting of the binary ice occurs in the wall, and the binary ice is returned with an almost constant ice concentration. As soon as the refrigerated container RC is then filled, and substantially the equilibrium temperature is obtained, the pump BID is stopped, the valves BIIV and BIOV are closed, and the refrigerated container RC is separated from the binary ice station BIOS. The container can now be moved, and for the compensation of pressure fluctuations due to the expansion and contraction of the binary ice fluid, pressure compensation valves are present in the form of small openings on the top of the container, or use is made of suitable volume compensating objects, such as flexible hoses.

Following the removal of the refrigerated container RC, the binary ice producer BIG can produce binary ice for the next filling process. The binary ice charging pump BIC delivers fluid from the tank BIST, which is enriched with ice crystals from the ice producing system BIG. The binary ice pump BIB will gradually deliver fluid from the binary ice liquid reservoir BIRL in order to increase the binary ice volume in the binary ice reservoir BIST. The binary ice reservoir BIST is consequently refilled within a certain time period.

As soon as the reservoir BIST is filled, the binary ice producer is switched off. This ensures that the binary ice charging system always has an adequate binary ice supply. If an empty refrigerated container RC has to be loaded, correspondingly, liquid is added to the reservoir BIRL. As the binary ice temperature is based on the quantity and nature of the freezing point-reducing substance ADD, optionally, a corresponding quantity of freezing point-reducing substance ADD is added, e.g. normal water (WAT), in order to obtain the typical temperature of the desired binary ice.

Also, when filling a container delivered with thawed binary ice, there is a controlled addition of ADD or merely water in order to arrive at the desired concentration. If there is too much fluid, preferably, some fluid is removed from the binary ice liquid reservoir BIRL, and this can optionally be stored in corresponding storage tanks.

The binary ice filling system BIFIS can be operated in the same way as a filling system. The frigorific energy, which can be supplied to a refrigerated container RC can either be fixed once and for all by the binary ice quantity filled into the refrigerated container, or by the thermal energy of the binary ice. Preferably, use is made of a monitoring method comprising the following steps:

a) emptying an "old" binary ice filling from the refrigerated container RC by the discharge of the liquid fraction into a corresponding binary ice liquid reservoir BIRL with a corresponding concentration of a freezing point-influencing medium ADD; this volume can e.g. be determined by a liquid level sensor LIC 3, and expressed as a so-called discharge rate DC in m$^3$;

c) following the removal of the old binary ice filling, the binary ice discharge pump BID is put into operation, and from the binary ice reservoir BIST, binary ice at a desired temperature is supplied to the refrigerated container RC; returned binary ice leaves the container through the binary ice outlet valve BIOV; for as long as the return temperature at the point TIC 1 is above the temperature at the point TIC 4 of the binary ice reservoir BIST, the binary ice valve BIS in the binary ice liquid reservoir BIRL will open; during this period, the binary ice flow at point FIC 2, and also the temperature difference TIC 1–TIC 4, and the ice concentration KIC 5 at the inlet and outlet of the refrigerated container RC are determined; these values and the associated time correspond to the so-called cooling rate (hereinafter "DR") in kWh;

c) when the temperatures behind the binary ice outlet valve BIOV at TIC 1 and the binary ice at TIC 4 are the same or almost the same, the valve BIS in the binary ice reservoir BIST opens and closes the binary ice liquid reservoir BIRL; the refrigerated container RC is now operated in circuit form with fresh binary ice; the ice concentration is determined at KIC 5 and, together with the volume taken from the refrigerated container RC, determines the so-called ice charge (hereinafter "IC"), which is also given in kWh; the volume received by the refrigerated container RC is fixed by measuring the liquid level in the binary ice reservoir BIST at LIC 7, and the binary ice liquid reservoir BIRL at LIC 3; the volume change is called the filling rate (hereinafter "FC"), which is given in m³.

c) the determined values can be represented in the following equation form:
frigorific energy supplied:

$$Q_{RC}=DR+IC \text{ [kWh]}$$

supplied ice volume:

$$V_{ICE}=FC-DC \text{ [m}^3\text{]}$$

in which $$FC=\Delta V_{BIST}+\Delta V_{BIRL}* \text{ [m}^3\text{]}$$

$$DC=\Delta_{BIRL}** \text{ [m}^3\text{]}$$

\* and \* \* in each case representing different BIRLs if the ADD concentration does not coincide.

For binary ice delivery stations, where binary ice fluid with different ADD concentrations occurs or is produced, it is advantageous not to mix these liquids and to install separate circuits, which differ from one another e.g. by specific couplings present on the containers. It is proposed that these couplings are separable and a partial section is left on the refrigerated container when the latter remains filled, so that on emptying, a connection can be made to said section which has been left behind, and which can only be brought about with accurately fitting sections, which ensure the emptying into the corresponding, correct binary ice liquid reservoir BIRL.

In order to obtain a uniform temperature distribution within the wall, structures are proposed, which within the binary ice-containing wall, prevent the binary ice from floating (the specific gravity of binary ice is normally lower than that of melted liquid). Otherwise, the binary ice would, after a certain time, collect in the upper area of an available interior of a wall. In order to achieve and equipartition (particularly of the temperature) over the wall, structures are proposed of the type shown in FIGS. 3 through 11, and are inserted in the container wall.

Figure 3:
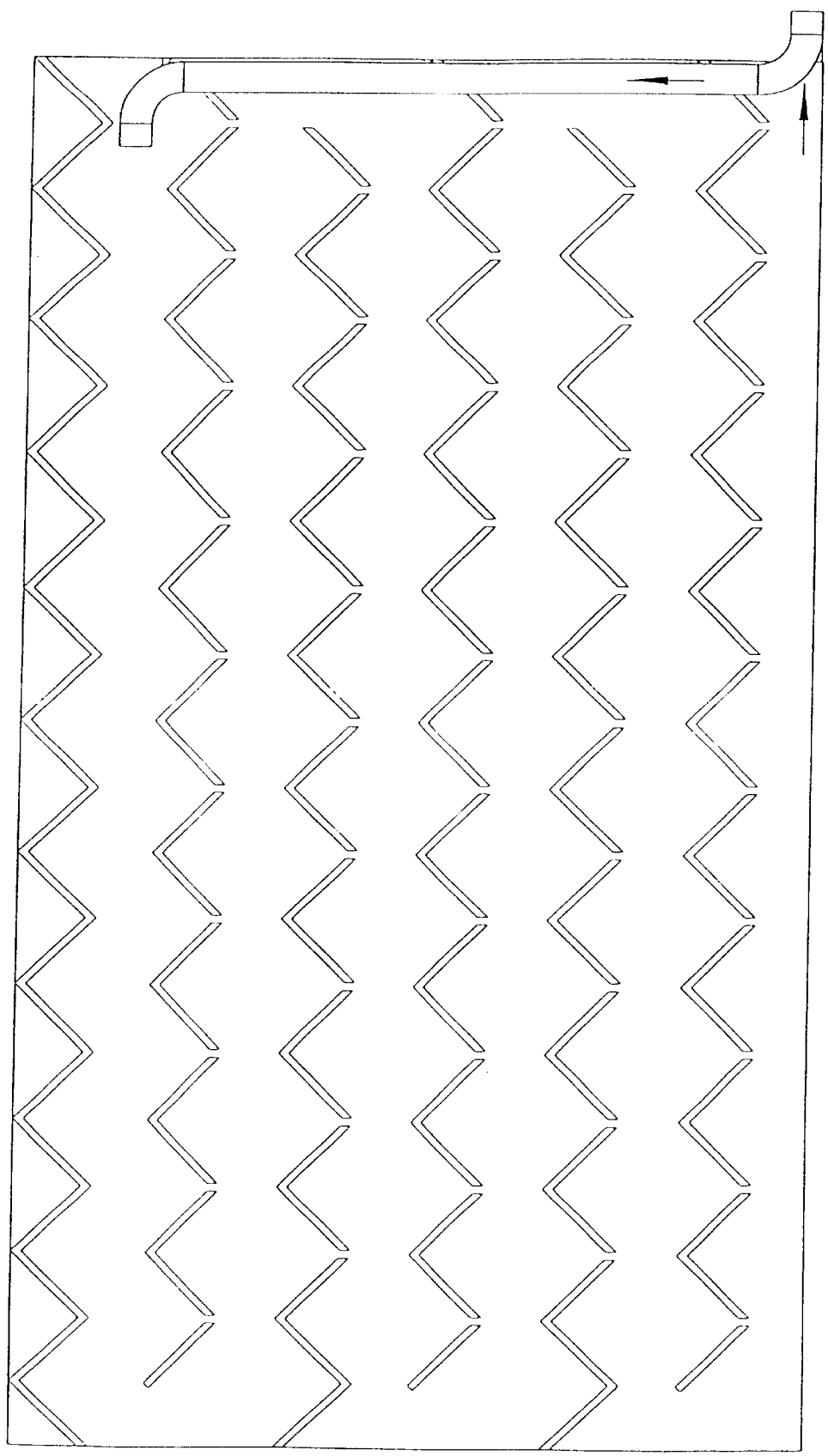
FIG. 3 shows a diagrammatic representation along the wall with a plurality of top-closed, bottom-open, zig-zag structures, and the proposed inflow and outflow connections.

In the case of the structure shown in FIG. 3, a plurality of right angles are proposed, which have two sides closed at the top by 45° angles and whose lower ends are juxtaposed slightly spaced from the sides. Binary ice is preferably filled from the top into such a wall and, as a result of narrow downward passages, only part of the binary ice can vertically flow out, whereas most of it is laterally distributed along a meandering passage having a much larger diameter. Small enclosed air fractions can be tolerated, but can also be removed by correspondingly smaller "air passages."

Figure 4:
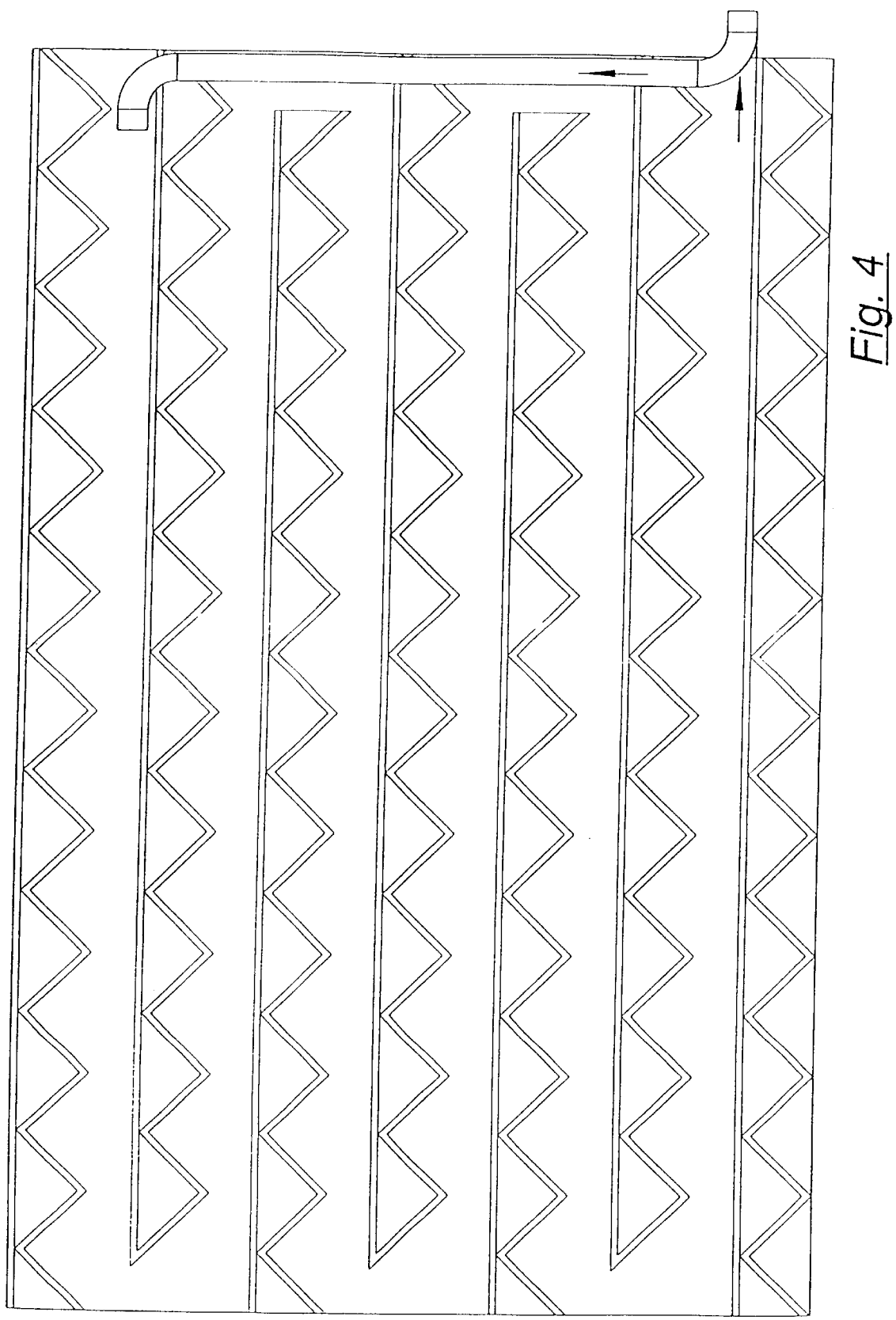
FIG. 4 shows an alternate embodiment with increased strength.

FIG. 4 shows a structure similar to FIG. 3 in which straight horizontal structures are provided for avoiding pockets which can retain "old" ice when emptying and which can be provided in the horizontal above the closed angle.

Figure 5:
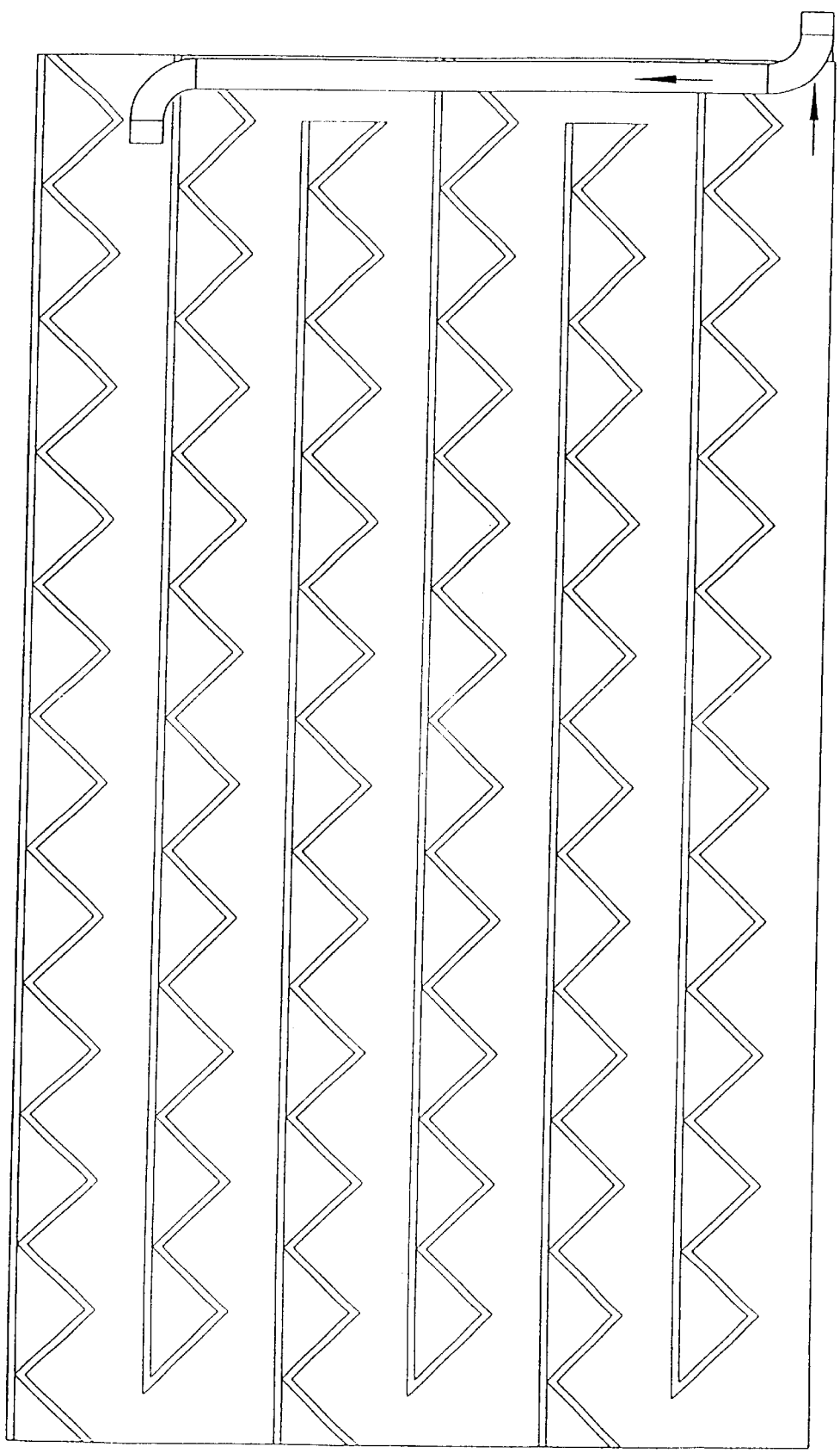
FIG. 5 shows an alternate embodiment with a higher filling volume.

FIG. 5 finally shows a representation substantially corresponding to FIG. 4, but in which the outward passage of the fluid takes place on the bottom.

Figure 6:
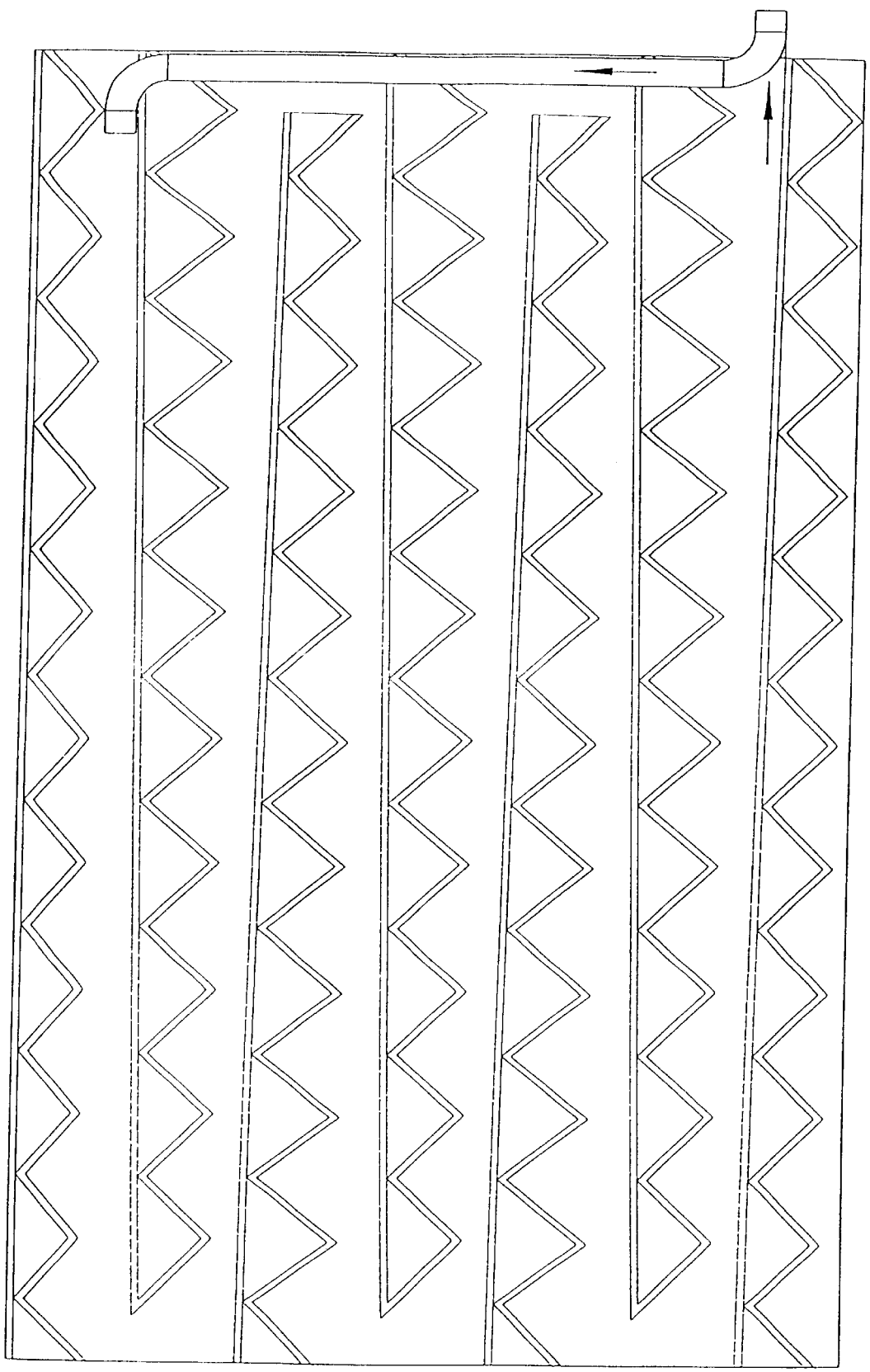
FIG. 6 shows the alternate embodiment of FIG. 4 with discharge bevels for emptying.

FIG. 6 shows the further proposal of slightly inclining these horizontal structures, so as to permit faster emptying.

Figure 7:
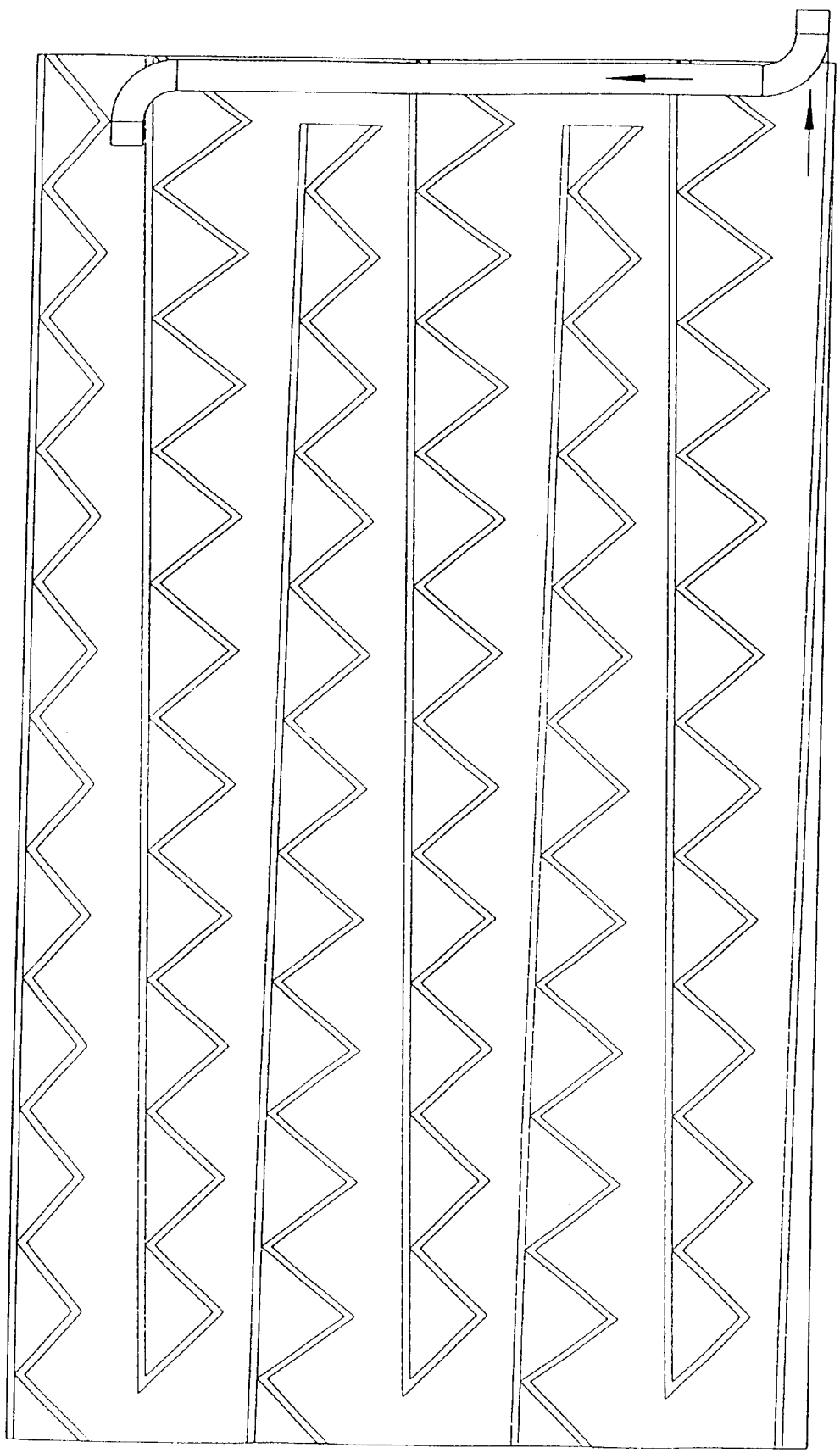
FIG. 7 shows the alternate embodiment of FIG. 5 with discharge bevels for emptying.

FIG. 7 shows a different construction to FIG. 5 where the fluid passes out from the bottom.

Figure 8:
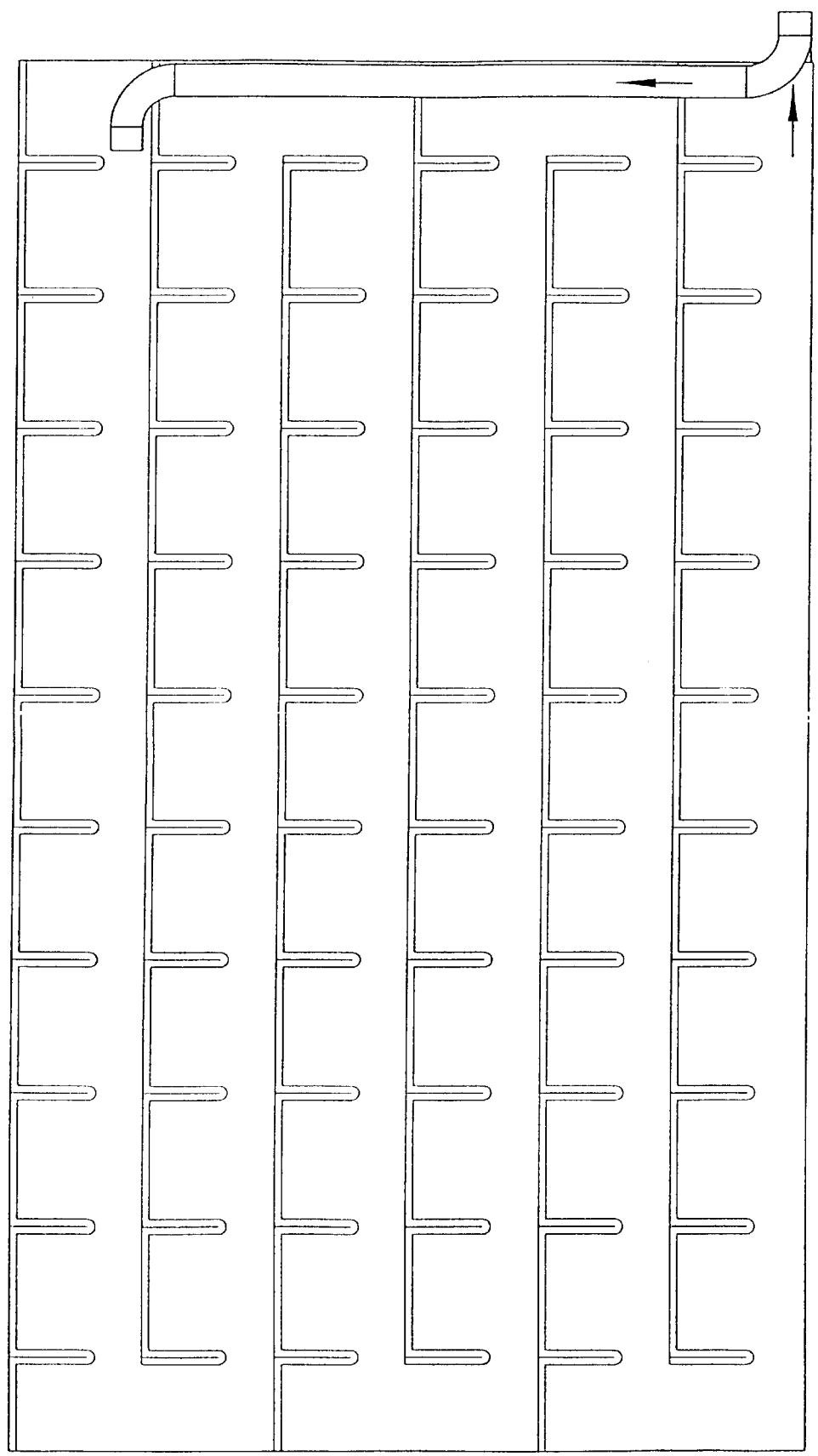
FIG. 8 shows an alternative embodiment utilizing a more easily manufacturable system resulting from right-angled arrangements.

FIG. 8 also retains substantially horizontal structures, but does not have angular structures, whose point is directed upwards, so as to give a boxlike, upwardly closed structure. As in FIG. 6, the horizontal orientation can also be inclined so as to facilitate emptying.

Figure 9:
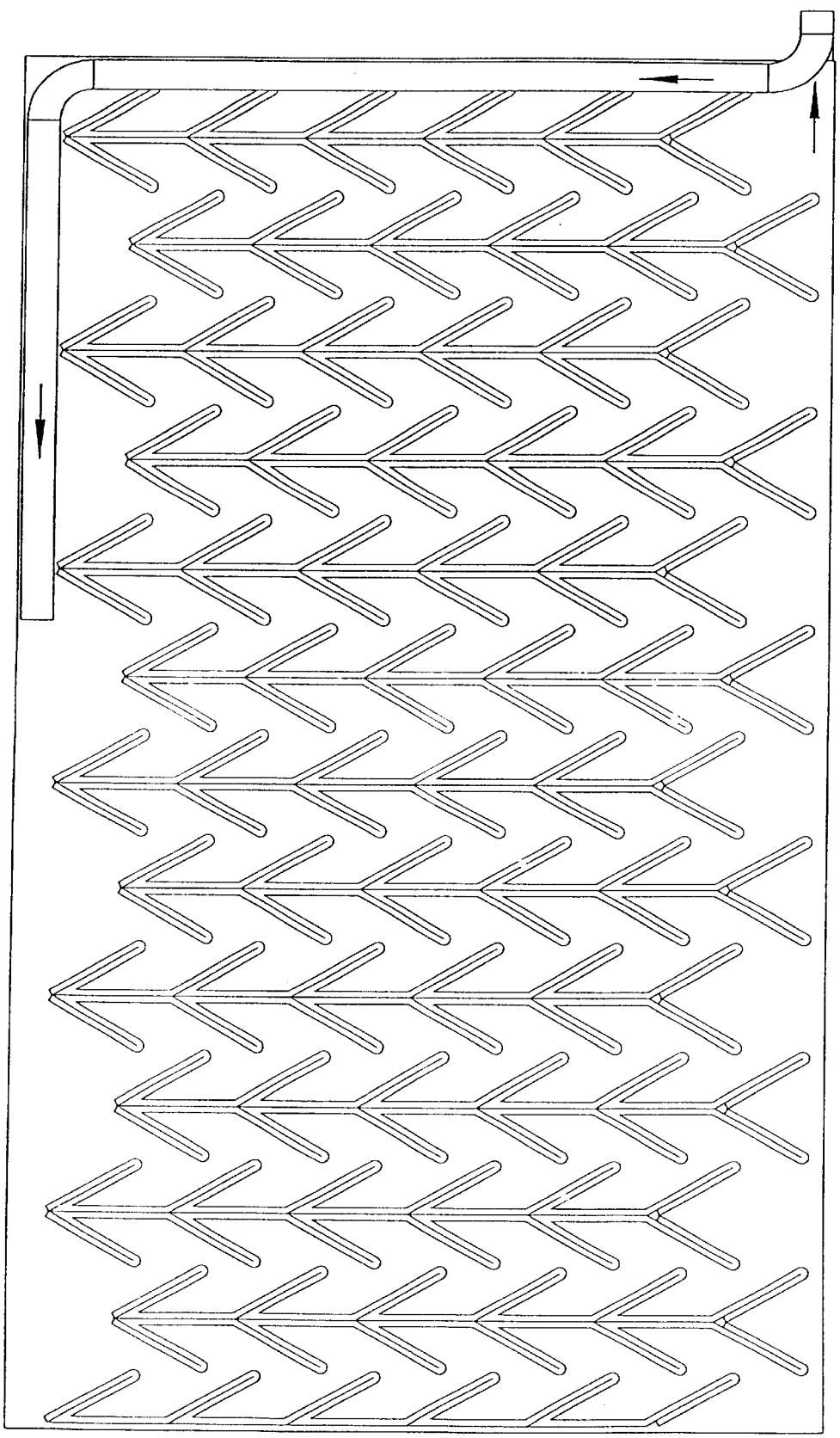
FIG. 9 shows an alternate embodiment utilizing another arrangement for simple emptying.

Moreover, as shown in FIG. 9 and while obviating horizontally, further extending structures, it is possible to use tree-like, substantially vertically extending structures.

Figure 10:
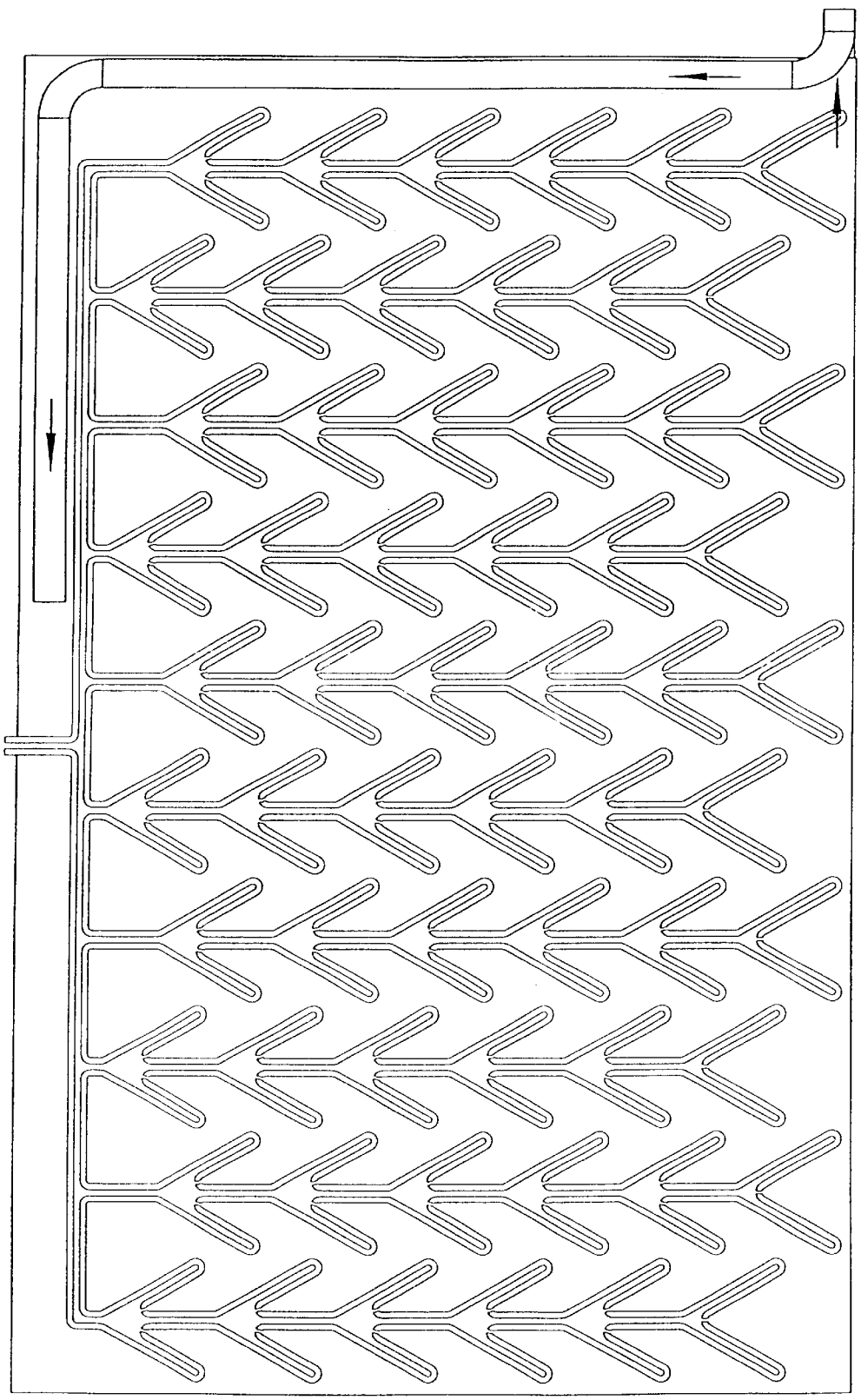
FIG. 10 shows the alternate embodiment of FIG. 9 with additional air removal pipes.

By means of such tree-like structures, FIG. 10 shows how with such structures having small air compensating holes at the top, it is possible to remove excess air avoiding air pocket formation. These air drains can be interconnected and lead to a central outlet.

Figure 11:
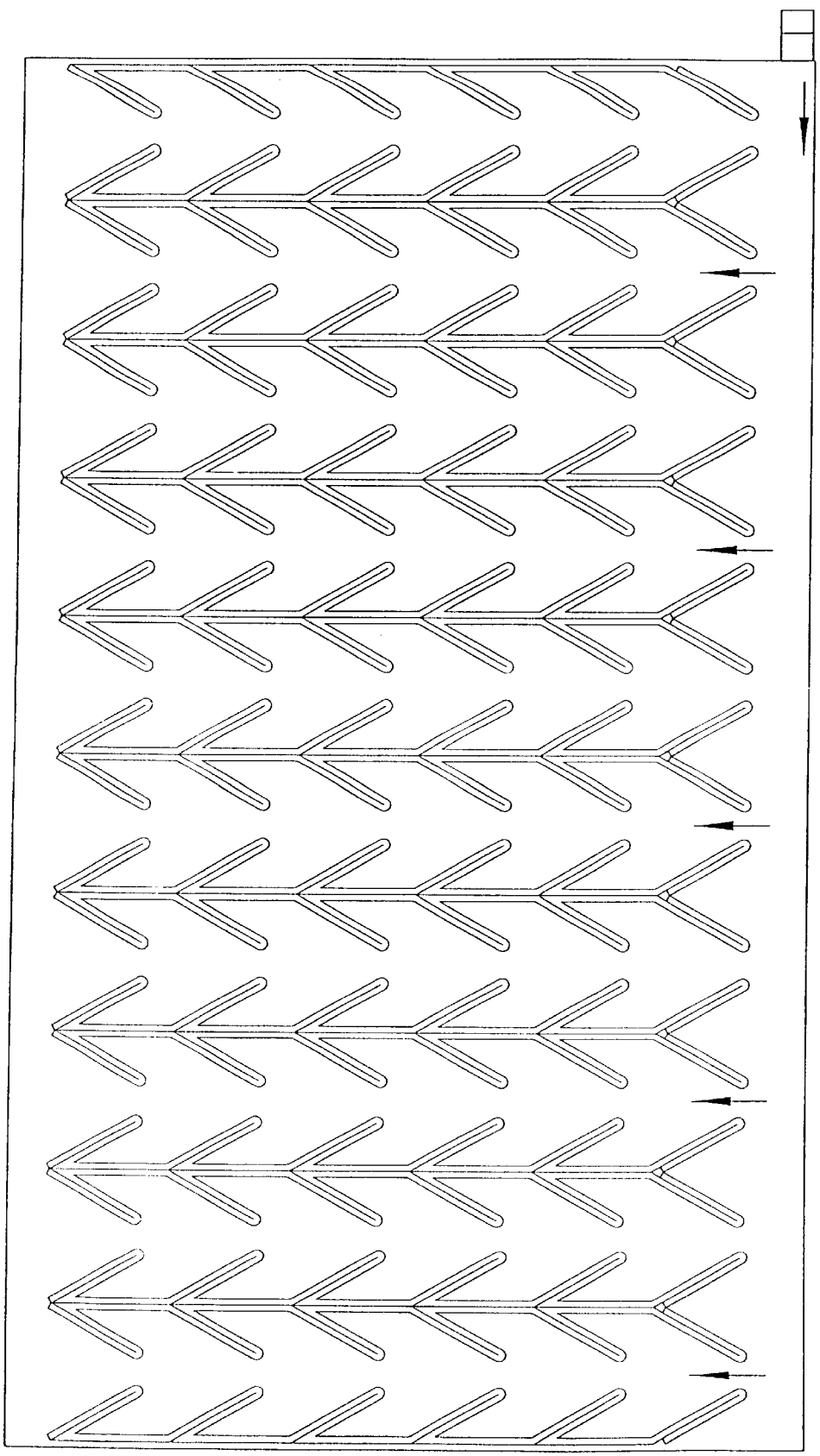
FIG. 11 shows the alternate embodiment of FIG. 9 with a different type of inflow.

FIG. 11 shows a variant where, in simplified form, the inflow and outflow are on the bottom.

Figure 12:
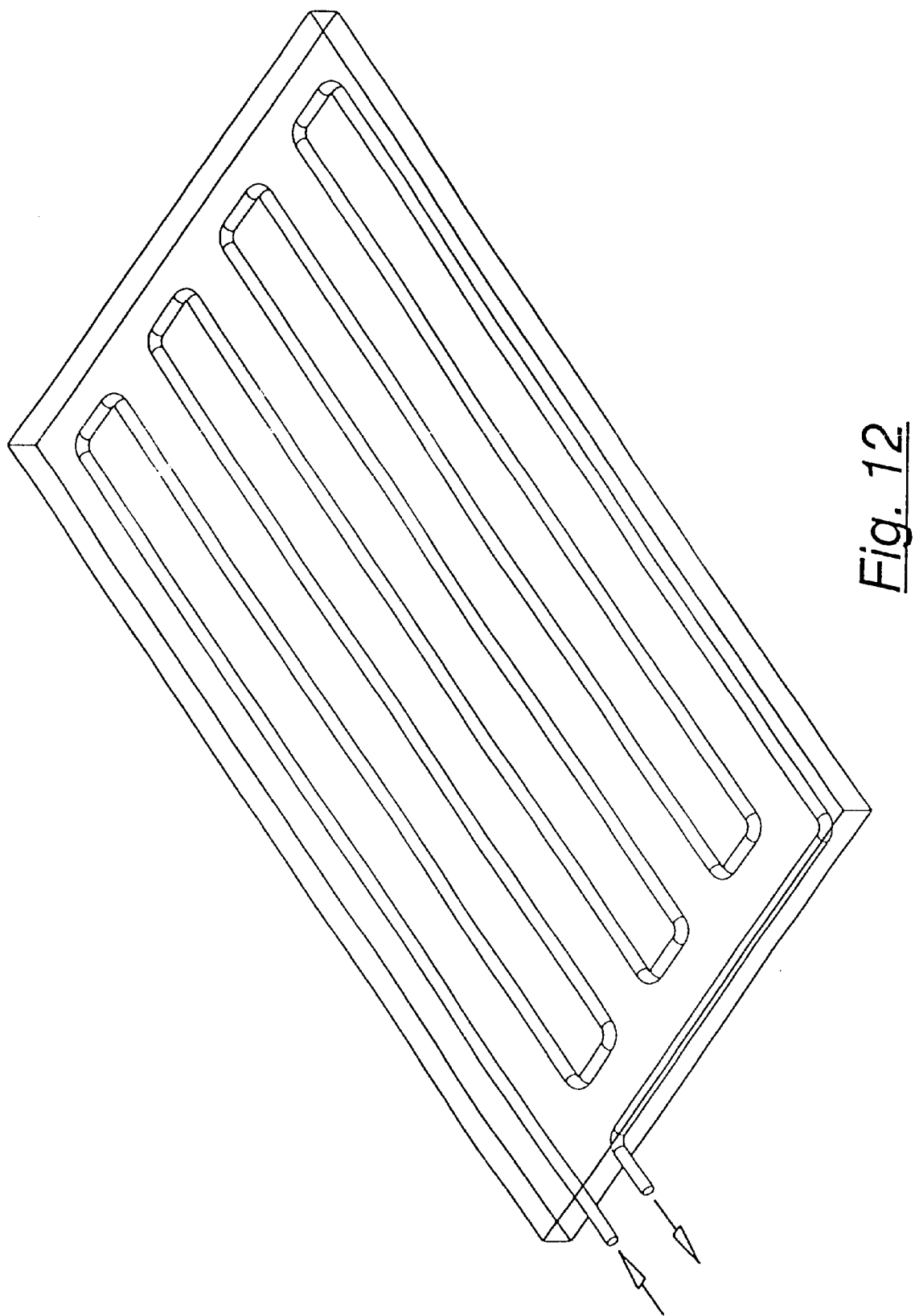
FIG. 12 shows an alternate embodiment for use with ceilings/roofs or doors in which, with the pipes introduced, refrigeration is brought about with a small binary ice volume and simultaneous stiffening of the large surface area.

FIG. 12 shows a roof or ceiling element with meandering pipes for receiving binary ice, and said panel can be used as a door or base. Because the pipes lead to increased stiffening of the structure, less binary ice is required in the bottom and top areas.

Figure 13:
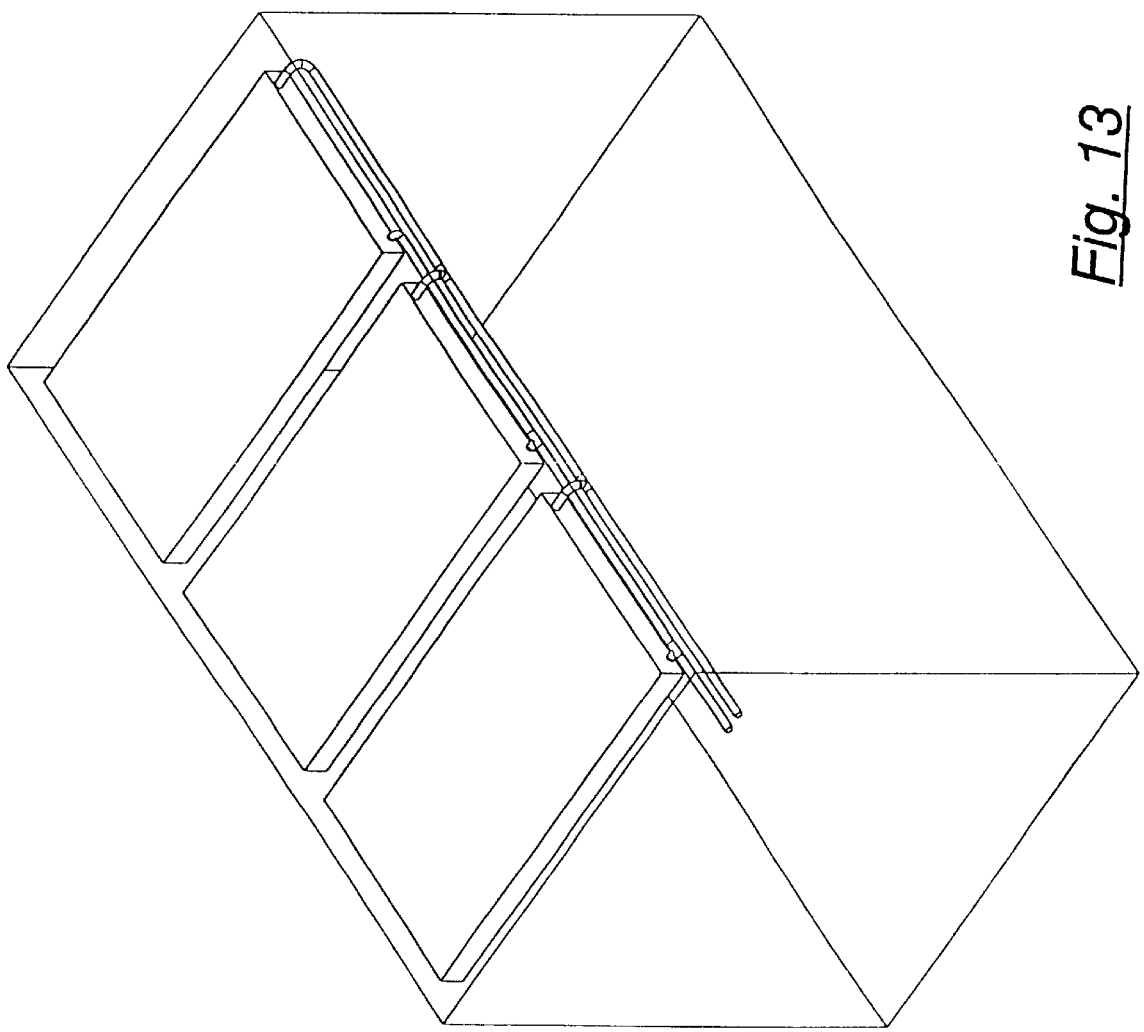
FIG. 13 shows a ceiling or roof arrangement with a plurality of flat ice reservoirs.

However, as shown in FIG. 13, it is also possible to provide flat receptacles within a roof. Within the inner zone, it is also possible to provide blowers or the like in order to homogenize the air temperature.

It is finally pointed out that the structures shown are also suitable for flexible, non-rigid walls, which is particularly suitable when refrigerated transportation is only necessary every so often, where e.g. a flat loading surface of a transportation vehicle initially has a base layer, then the product to be transported, and subsequently the walls, can be placed optionally in a cushion-like manner around the refrigerated product in order to permit refrigerated transportation surrounding said product.

Such cushions can also be externally thermally insulated. As a result of the flexibility, they can also surround irregular geometries of the refrigerated product. This method is particularly suitable for sporadic refrigerated transportation, while being simple and inexpensive.

Equivalent elements, components and steps can be substituted for the ones set forth above such that they perform the same function in the same way for achieving the same result.

Having thus described the invention, what is claimed and desired to be secured by Letters Patent is:

1. A method for refrigerated transportation of a product enclosed within a hollow-walled refrigerated container, the hollow-walled refrigerated container defining a cavity capable of receiving an aqueous solution, the steps of the method comprising:

a) providing a reservoir containing an aqueous suspension of minute ice crystals having a predetermined composition and temperature, b) emptying any liquid contained within the hollow-walled refrigerated container cavity through an outlet valve connected to a receptacle, c) filling the empty cavity of the hollow-walled refrigerated container with the aqueous suspension by pumping the suspension from the reservoir through at least one filling valve, d) permitting the aqueous suspension of minute ice crystals to circulate into the hollow-walled refrigerated container cavity through the cavity until the temperature of the hollow-walls reaches a predetermined temperature, e) expelling any heated aqueous suspension of minute ice crystals from the hollow-walled refrigerated container cavity out through the outlet valve and into the receptacle, f) filling the hollow-walled refrigerated container cavity with a predetermined level of the aqueous suspension of minute ice crystals through the at least one filling valve from the reservoir, and g) closing the outlet valve and the at least one filling valve.

2. The method of claim 1, wherein the aqueous suspension of minute ice crystals is expelled from the cavity by an air compressor.

3. The method of claim 1, wherein the aqueous suspension of minute ice crystals is expelled from the cavity by a vacuum.

4. The method of claim 1, wherein a standardized compressed air connection and a plurality of different couplings are employed at a filling station for permitting varying compositions and temperatures of the aqueous suspension of minute ice crystals to be used within the hollow-walled refrigerated container cavity.

5. The method of claim 1, wherein two filling valves are employed and the outlet valve permits the expelling of the aqueous suspension to be directed to either the reservoir or the receptacle.

6. The method of claim 1, wherein the hollow-walled refrigerated container includes a guiding wall having a plurality of pockets for preventing the formation of agglomerates within the aqueous suspension of minute ice crystals.

7. The method of claim 6, wherein the plurality of pockets are formed by substantially right-angled, upwardly closed, angular divisions.

8. The method of claim 7, wherein a substantially horizontal guide is provided above the angular divisions.

9. The method of claim 7, wherein a plurality of inclined and substantially horizontal guides are provided for emptying double walls of the aqueous suspension of ice crystals.

10. The method of claim 7, wherein a plurality of exhaust lines are provided for preventing the formation of agglomerates within the aqueous suspension of minute ice crystals.

11. The method of claim 10, wherein the exhaust lines are interconnected.

* * * * *